No. 862,618. PATENTED AUG. 6, 1907.
J. J. DOSSERT.
COUPLING FOR LEAD COVERED ELECTRIC CABLES.
APPLICATION FILED JAN. 19, 1904.
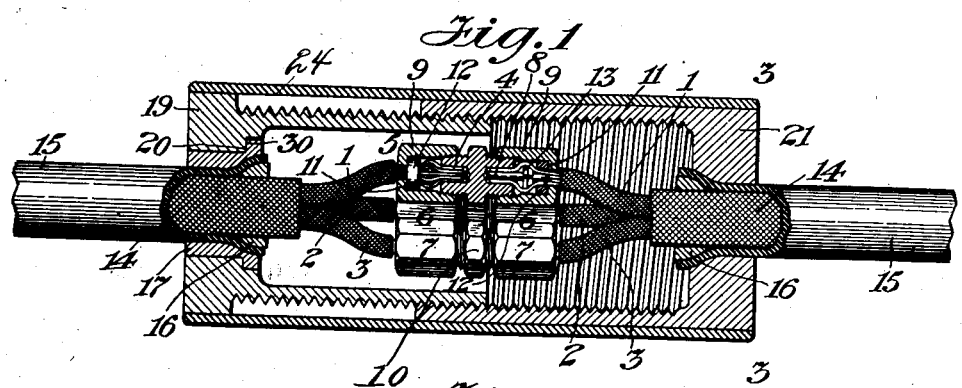
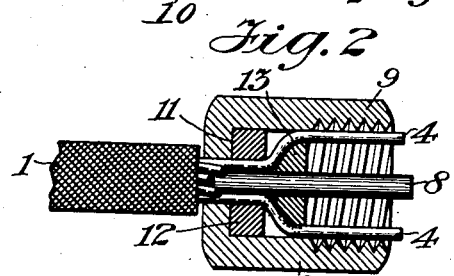
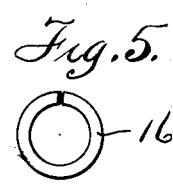
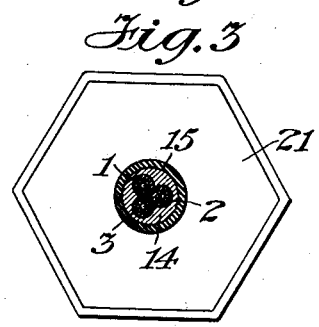
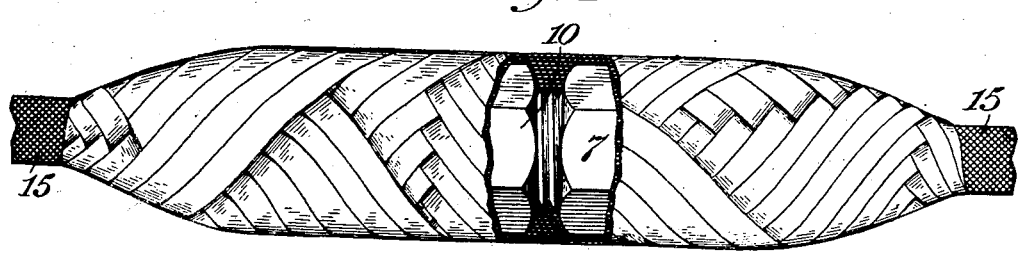
Witnesses
Chas. F. Clagett
Thos. H. Brown
Inventor
John J. Dossert
By his Attorney
Geo. H. Stockridge

UNITED STATES PATENT OFFICE.

JOHN J. DOSSERT, OF NEW YORK, N. Y., ASSIGNOR, BY DIRECT AND MESNE ASSIGNMENTS, TO DOSSERT & COMPANY, A CORPORATION OF NEW YORK.

COUPLING FOR LEAD-COVERED ELECTRIC CABLES.

No. 862,618.

Specification of Letters Patent.

Patented Aug. 6, 1907.

Application filed January 19, 1904. Serial No. 189,764.

*To all whom it may concern:*

Be it known that I, JOHN J. DOSSERT, a citizen of the United States, and a resident of New York, county of New York, State of New York, have invented certain new and useful Improvements in Couplings for Lead-Covered Electric Cables, of which the following is a specification.

In Letters Patent No. 779,469, dated June 10, 1905, I have shown and described a coupling device for electric cables, the particular device disclosed in the said application being designed for joining two parts of a stranded electric cable, or joining one end of such a cable to a suitable terminal.

In the present application I show and describe a device which is particularly designed for joining the ends of lead covered cables such as are commonly used in the underground work.

So far as the stranded cables, or parts of cables, are concerned, the present invention makes use of the same sort of coupling device as was described in the earlier application. The improvement described herein combines with the coupling set forth in the prior application another coupling designed to join the ends of the lead sheathing for underground cables in such a manner as to make the entire joint simple, strong, compact, durable and easy of manipulation.

My invention will be understood by reference to the accompanying drawings in which Figure 1 is a partly sectional view of my coupling as applied to a lead covered cable; Fig. 2 illustrates one end of a conductor which may form part of such a cable, showing the said conductor at one stage of the coupling operation; Fig. 3 is a cross section of one of the conductors looking towards the sheath coupling. Fig. 4 illustrates an enlargement of one of the insulating joints illustrated a mode and Fig. 5 is a plan view of a compressible ring.

In Fig. 1 I have shown a cable composed of three conductors, 1, 2 and 3, each of the said conductors being itself provided with strands, shown at 4, 4. The main conductors 1, 2 and 3 are illustrated as being connected with suitable couplings, 5, 6 and 7, respectively. The coupling 5 is illustrated in section, and shows the strands 4, 4 and also the core, 8, of the said conductor. The structure at the adjacent ends of the conductor is identical, and the corresponding parts are represented by similar characters.

Referring now to the coupling 5, which is shown in section, it will be seen that the said coupling is composed of two end portions, 9, 9, and an intermediate portion, 10. The end portions are adapted to be slipped over the strands 4, 4, and are each provided with a shoulder, 11, which extends inward into comparatively close contact with the strands. Inside the section 9, 9 are rings, 12, 12, which also fit closely over the strands. In coupling the parts, the strands at the end of the cable are laid bare and the coupling section 9 is placed over the end and also the ring 12, after which the strands are spread by any suitable tool until they occupy the position illustrated in Fig. 2. A compressible ring, 13, is then slipped over the core, and the strands are pressed down again into contact with the core around the compressible ring 13. The parts are now ready for the application of the central coupling piece, 10, it being understood that the latter is provided at each end with an external screw-thread adapted to engage with the internal screw-thread on the coupling, 9, 9. By rotating the end coupling sections, a firm connection can now be made between the end and intermediate coupling sections, by which process good electrical connection is made between the said couplings and the strands and also between the strands themselves and their respective cores. When the act of coupling is completed, there exists a strong joint between the adjacent ends of the conductor and the electrical continuity is also good. In other words, the strands being pressed closely against the core and the rings 12 being firmly pressed against the bulging portions of the strands caused by the presence of the compressible collars, 13, 13, there is a complete and good connection from the end of one conductor to that of the adjacent conductor.

The cable made up of the three conductors 1, 2 and 3 is generally surrounded by an insulating sheathing 14, and this in turn is covered with a sheathing, 15, of lead or other compressible material.

It will be understood that several couplers, 5, 6 and 7, are insulated from each other by suitable wrappings or windings of insulating tape so that no cross circuits shall take place between the said coupling sections. One such wrapping or winding is illustrated in Fig. 4, as being applied to one of the couplings.

Before the several conductors are coupled as already described, the sections of my new coupler are slipped over the ends of the sheathing 15, one such section being shown at 19 and the other at 21. These sections are screw-threaded at their adjacent ends and are adapted to engage each other for which purpose said coupling sections are substantially polygonal in cross section, as shown in Fig. 3, in order that they may be readily fitted with a wrench or spanner for screwing them into position. And when thus assembled they are adapted to be closely incased and held against rotation by a locking sleeve 24 which is likewise of similar design in cross section as said coupling members. The end of the coupling section 21 fits closely around the sheathing 15 and is flared or made conical on its inner side for a purpose which will be presently explained. The end of the section 19 is adapted to surround a sleeve 17 having a shoulder, 30, and having its inner end flared or cone-shaped like the inner end of the section 21. The coupling section 19 is also provided with a shoulder 20, corresponding to the shoulder 30 on the sleeve and is adapted to be pressed against the said shoulder when the coupling sections are joined by being screwed together.

The sheathing 15 at each of the cable ends to be joined together is spread by driving into place between the said sheathing and the covering 14 a cone shaped or flaring piece, 16. If preferred the spreading may be accomplished by means of a special tool suited for the purpose, and the cone shaped or flaring piece 16 may afterward be inserted in position. This cone-shaped piece may be a compressible collar such as a split ring although it is obvious that any kind of a compressible ring may be used.

When the collars are in place, an enlargement is formed on the end of each portion of the cable, and upon screwing the coupling sections together the inner end of the section 21 and also the inner end of the sleeve 17 are pressed firmly against the enlarged portions and are prevented from passing any further. It is clear that as the coupling sections 19 and 21 slide toward each other as they are screwed up, the weight of the cables or conductors 14 is sufficient to prevent relative movement of the adjacent cable ends and furnish a resistance which will result in the said coupling sections 19 and 21, clamping the ends of the sheathing 15 and the rings 16 firmly in place. At the same time firm mechanical connection is made between the several parts of the cable and this connection is practically water and gas tight and at the same time can easily be disconnected for making repairs or for any other reason.

It will be understood that the coupler which more particularly constitutes the subject of the present application may be combined with any type of coupling devices for the several conductors forming the cable. It will also be understood that the present coupler is applicable to cables which are formed of a single stranded conductor or a single lead covered wire with interposed insulating material.

In using the term "lead covered cable" in the present specification and claims, I do not wish to confine myself to sheathings composed of lead alone, as the principle of the invention would apply to cables covered with sheathings of any compressible material.

The coupling sections 19 and 21 themselves will ordinarily be made of lead or a mixture of lead and antimony, although brass or other material may be employed. In some instances non-metallic compositions may be utilized for forming these coupling sections.

I claim as my invention:—

1. A mechanical connection for electric cables having sheathing spread at their adjacent ends, comprising a coupling applied to said cable, said coupling having compressible rings within the spread ends of the sheathing, inter-engaging coupling sections, said compressible rings being independent of the coupling sections and means movable relative to said rings whereby the ends of the sheathing may impinge against said rings.

2. The combination with electric cables covered with sheathing spread at their adjacent ends, of a coupling applied to said sheathing and comprising compressible rings lying within the spread ends of the sheathing, said compressible rings being independent of the coupling inter-engaging coupling sections, and means whereby the ends of the sheathing may be compressed against said rings, and a locking device for and inclosing the coupling sections.

3. The combination with electric cables covered with soft metal sheathing spread at their adjacent ends, of a coupling applied to the sheathing and comprising compressible rings lying within the spread ends of the sheathing, polygonal-sided inter-engaging coupling sections; said rings being free from engagement with said coupling sections, means whereby the ends of the sheathings may be compressed against said rings, and a locking device engaging the sections of the coupling for securing the latter.

4. The combination with electric cables having a plurality of conductors, each set of said conductors covered by a sheathing, said sheathings being spread at their adjacent ends, an independent and stationary compressible ring around each set of said conductors and within the spread sheathing, inter-engaging coupling sections, said sections surrounding the sheathings and adapted to impinge said sheathings against the compressible rings when said sections are assembled.

5. The combination with electric cables having a plurality of conductors, each set of said conductors covered by a sheathing, said sheathings being spread at their adjacent ends, compressible and stationary rings around said cables and within the spread sheathing, polygonal-sided coupling sections connecting said cables and providing a chamber for said conductors, said coupling sections comprising two inter-connected members engaging the sheathing and adapted to impinge the same against said compressible rings, and a polygonal-sided sleeve for locking said sections together.

Signed at New York, in the county of New York, and State of New York, this 8th day of January, A. D. 1904.

JOHN J. DOSSERT.

Witnesses:
  WM. H. CAPEL,
  GEORGE H. STOCKBRIDGE.